US008608836B2

(12) United States Patent
Girard et al.

(10) Patent No.: US 8,608,836 B2
(45) Date of Patent: Dec. 17, 2013

(54) INTEGRAL HYDROGEN AND AIR PURIFIER

(75) Inventors: Karen Girard, Methuen, MA (US); John J. Ronan, Kensington, NH (US); George Zugravu, Methuen, MA (US)

(73) Assignee: Parker-Hannifin Corporation, Cleveland, OH (US)

( * ) Notice: Subject to any disclaimer, the term of this patent is extended or adjusted under 35 U.S.C. 154(b) by 326 days.

(21) Appl. No.: 12/995,055

(22) PCT Filed: Apr. 30, 2009

(86) PCT No.: PCT/US2009/042364
§ 371 (c)(1),
(2), (4) Date: Apr. 27, 2011

(87) PCT Pub. No.: WO2009/146233
PCT Pub. Date: Dec. 3, 2009

(65) Prior Publication Data
US 2011/0194989 A1 Aug. 11, 2011

Related U.S. Application Data

(60) Provisional application No. 61/056,870, filed on May 29, 2008, provisional application No. 61/080,721, filed on Jul. 15, 2008.

(51) Int. Cl.
*B01D 53/22* (2006.01)
*B01J 19/00* (2006.01)
(52) U.S. Cl.
USPC ......... 96/4; 95/55; 95/56; 55/342.2; 422/198; 422/211

(58) Field of Classification Search
USPC ........ 96/4; 95/45, 55, 56; 55/342.2; 422/198, 422/630, 211; 48/61, 76
See application file for complete search history.

(56) References Cited

U.S. PATENT DOCUMENTS

| 3,901,668 | A | * | 8/1975 | Seitzer | 95/56 |
| 5,931,987 | A | * | 8/1999 | Buxbaum | 95/56 |
| 6,071,481 | A | * | 6/2000 | Mathews et al. | 422/170 |
| 6,221,117 | B1 | * | 4/2001 | Edlund et al. | 95/56 |
| 7,087,211 | B2 | * | 8/2006 | Balachandran et al. | 95/56 |
| 2006/0013762 | A1 | * | 1/2006 | Kuipers et al. | 48/61 |
| 2007/0240566 | A1 | * | 10/2007 | Benn et al. | 95/56 |

FOREIGN PATENT DOCUMENTS

| GB | 2 103 593 | 2/1983 |
| GB | 2 103 593 A | * 2/1983 |

OTHER PUBLICATIONS

International Search Report for corresponding application No. PCT/US2009/042364 dated Jul. 24, 2009.

* cited by examiner

*Primary Examiner* — Jason M Greene
(74) *Attorney, Agent, or Firm* — Renner, Otto, Boisselle & Sklar, LLP

(57) ABSTRACT

A gas purifier assembly for providing first (50) and second (38) purified gas streams having an integral heater (54). The assembly can have two separate chambers for gaseous fluid flow for the purpose of purifying a gas stream of hydrogen (34), for example, and a separate distinct stream of gas such as compressed air (46). A centrally located heater heats the first chamber to effect purification of the first gas. Waste heat from the first chamber is transferred to the second chamber via conduction to effect purification of the second gas stream.

18 Claims, 6 Drawing Sheets

INTEGRAL HYDROGEN AND AIR PURIFIER

RELATED APPLICATIONS

This application claims the benefit of U.S. Provisional Application No. 61/056,870 filed May 29, 2008, and U.S. Provisional Application No. 61/080,721 filed Jul. 15, 2008, both of which are hereby incorporated herein by reference.

FIELD OF THE INVENTION

The present invention relates generally to gas purification devices and, more particularly, to an integral gas purifier unit for providing multiple streams of purified gas.

BACKGROUND OF THE INVENTION

Supplies of clean gasses are often needed in laboratories, research facilities, etc. Cylinder gas is often used for supplying clean gas, but such arrangement provides only a finite amount of clean gas and the cylinders can be expensive to refill and/or replace. Gas cylinders also can be a safety hazard.

Another option for supplying clean gas is to utilize one or more gas purifiers for generating desired purified gas streams onsite. For example, hydrogen purifiers are often used for provided a purified stream of hydrogen gas. A known type of hydrogen purifier has a gas-tight chamber in which is provided a coil of tubing of palladium alloy. The coil has at one end an externally accessible input end and at the other end of the coil an externally accessible output end. Crude hydrogen carrying impurities is fed under pressure into the input end and a waste gas containing all of the impurities is withdrawn from the output end of the coil. When the coil is heated to a sufficient temperature, hydrogen permeates through the palladium-alloy wall of the coil and can be withdrawn from the interior of the chamber. Such a filter is termed an absolute filter as nothing but hydrogen can pass through the walls of the tubing, so that hydrogen of perfect purity can be withdrawn from the chamber.

SUMMARY OF THE INVENTION

The invention provides a gas purifier assembly for providing first and second purified gas streams having an integral heater. As compared to two separate gas purifiers, the assembly can be more compact in size and uses a single heat source. Thus, the assembly can be more efficient to operate and/or less expensive to manufacture.

More particularly, the assembly can have two separate chambers for gaseous fluid flow for the purpose of purifying a gas stream of hydrogen, for example, and a separate distinct stream of gas such as compressed air. A centrally located heater heats the first chamber to effect purification of the first gas. Waste heat from the first chamber is transferred to the second chamber via conduction to effect purification of the second gas stream.

Accordingly, a gas purification system comprises a first gas purifier for purifying a first gas stream, a second gas purifier for purifying a second gas stream, and a heating element for heating the first and second gas purifiers. The heating element can be adapted to heat directly the first gas purifier and to heat indirectly the second gas purifier, and the first and second gas purifiers can be in thermally conductive contact. The first and second gas purifiers can be arranged concentrically about the heating element such that heat from the heating element can be supplied directly to the first gas purifier and indirectly to the second gas purifier.

In an exemplary embodiment, the first gas purifier is a zero air module including the heating element, and the second gas purifier is a hydrogen purifier. The zero air module can be received in a central chamber of the hydrogen purifier. The central chamber of the gas purifier can be generally cylindrical, and the zero air module can have a generally cylindrical housing configured to be slip fit into the chamber of the gas purifier. The zero air module can be removed from the gas purifier assembly as a unit. The heater element can be configured to heat the zero air module to about 600 degrees Celsius and the gas purifier to about 400 degrees Celsius. The hydrogen gas purifier can include a palladium/silver filter.

According to another aspect, a gas purification assembly comprises a gas purifier for producing a purified gas stream when heated, the purifier having an inlet for receiving a crude gas stream and an outlet through which the purified gas stream can flow, a zero air module for producing a stream of purified hydrocarbon-free air when heated, the module having an inlet for receiving crude air and an outlet through which purified air stream can flow, and a heater element for supplying heat to both the gas purifier and the zero air module. The gas purifier is adapted to receive waste heat from the zero air module for heating the gas purifier to a prescribed temperature for producing the purified gas stream.

More particularly, the gas purifier can at least partially surround and be in contact with the zero air module. The gas purifier can have a central chamber in which the zero air module is received whereby heat is transferred to the gas purifier via conduction. The central chamber can be generally cylindrical and the zero air module can have a generally cylindrical housing configured to be slip fit into the chamber of the gas purifier. The zero air module and gas purifier can be arranged concentrically about the heating element such that heat from the heating element can be supplied directly to the zero air module and indirectly to the hydrogen purifier. The zero air module and the gas purifier can each be removable from the purification system as units. The heater element can be configured to heat the zero air module to about 600 degrees Celsius and the gas purifier to about 400 degrees Celsius.

Further features of the invention will become apparent from the following detailed description when considered in conjunction with the drawings.

DETAILED DESCRIPTION

Figure 2:
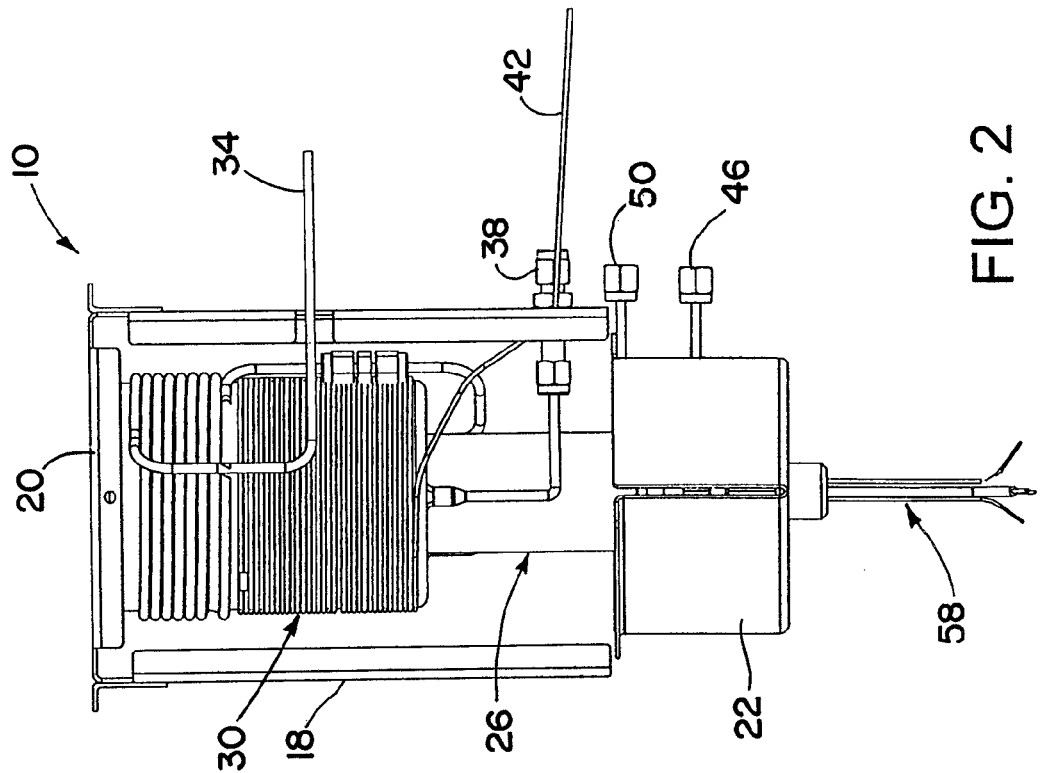
FIGS. 2 and 3 are alternative side views of the exemplary gas purifier assembly of FIG. 1 with a portion of a housing removed to expose the interior of the assembly and the first and second gas purifiers.
Figure 1:
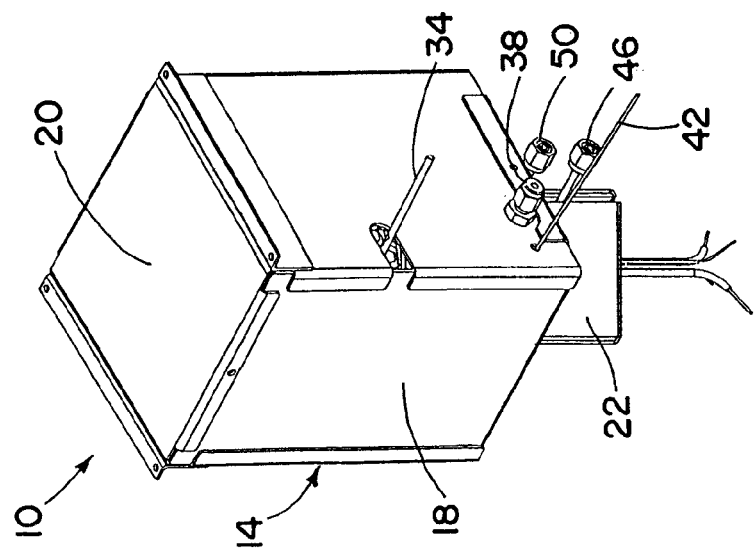
FIG. 1 is perspective view of an exemplary gas purifier assembly having first and second gas purifiers in accordance with the invention.

Turning now to the drawings in detail, and initially to FIGS. 1-4, an exemplary gas purifier assembly in accordance with the invention is illustrated and indicated generally by reference numeral 10. The gas purifier assembly 10 has a housing 14 including four sidewall portions 18, a top portion 20 and a bottom enclosure 22. As will be described in more detail below, the gas purifier assembly 10 includes first and second gas purifier units. In the illustrated embodiment, the first and second gas purifiers include a hydrogen purifier and a zero air module for producing hydrocarbon-free air, but other types of purifiers can be employed without departing from the scope of the invention.

Figure 3:
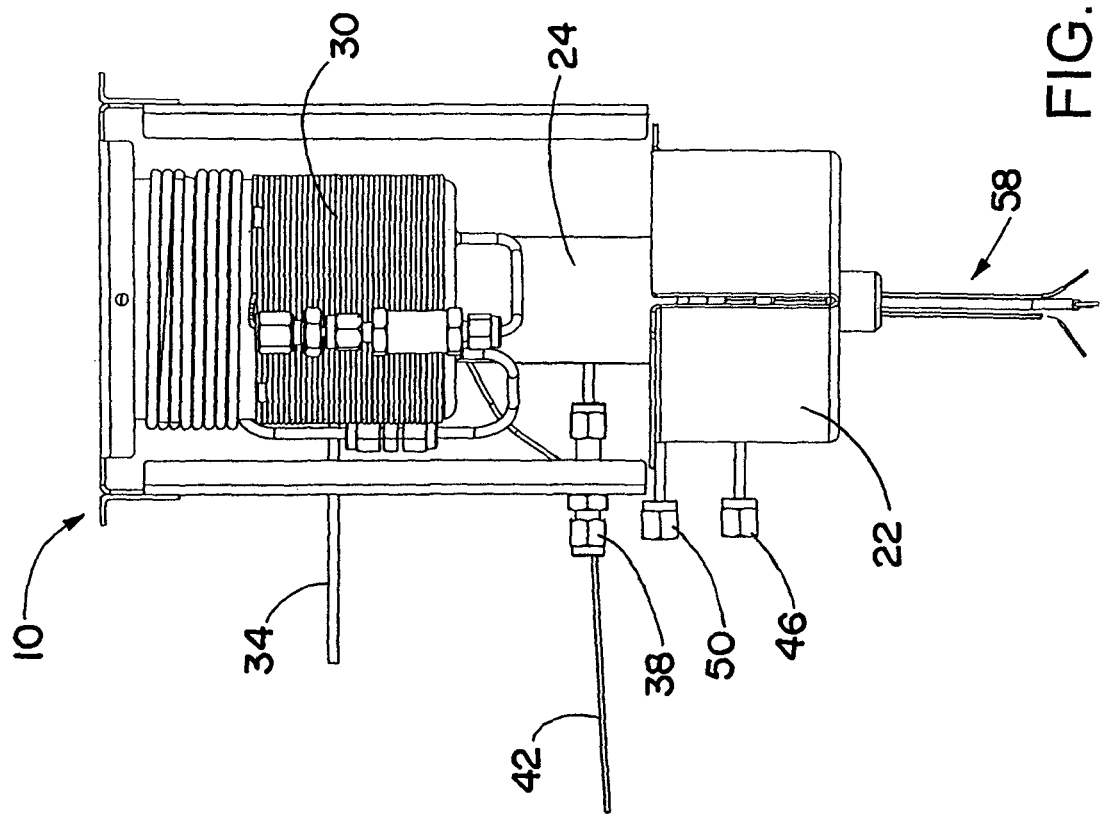

In FIGS. 2 and 3 a sidewall portion 18 of the housing 14 has been removed from the gas purifier assembly 10 such that both the zero air module 26 and the hydrogen purifier 30 are visible. The hydrogen purifier 30 includes a hydrogen feed line 34 for connection to a source of crude hydrogen that may contain impurities, an outlet 38 through which pure hydrogen flows once separated from any impurities, and a bleed line 42 through which the impurities flow. The zero air module 26 has an inlet 46 for receiving a compressed air stream, and an outlet 50 through which zero air (e.g. air having zero hydrocarbons) flows.

Figure 4:
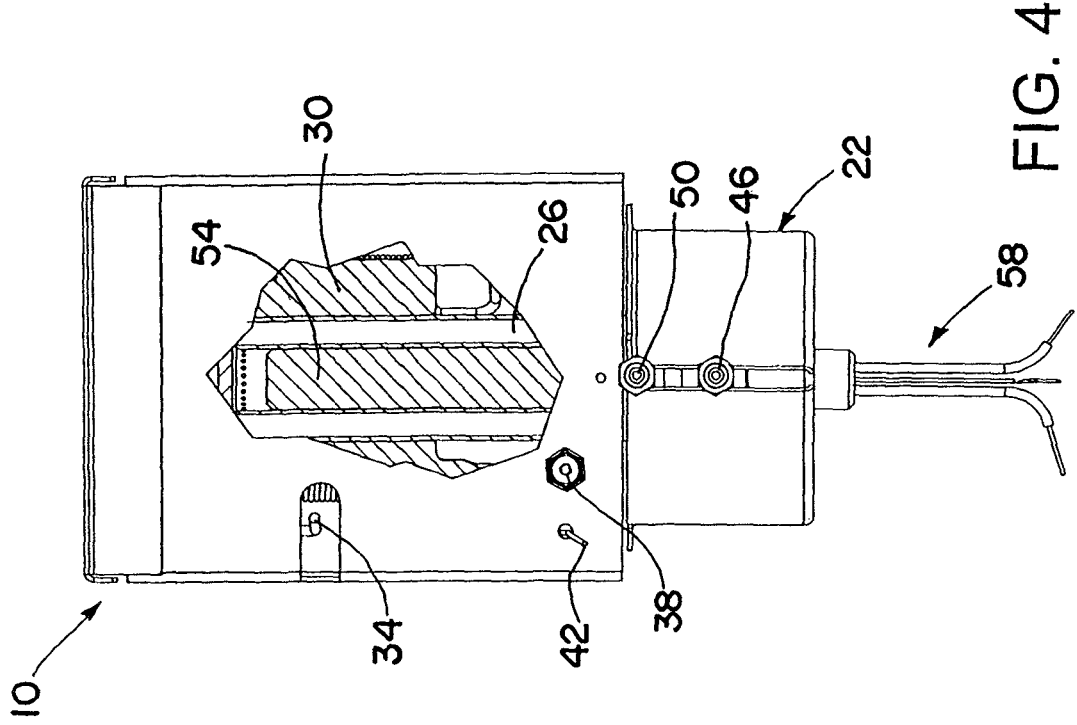
FIG. 4 is a partially cutaway side view of the gas purifier assembly illustrating a heater element of the assembly.

Turning to FIG. 4, a heating element 54 for heating both the zero air module 26 and the hydrogen purifier 30 is illustrated. The heating element 54 can be a resistive heating element, for example, and includes wires 58 for the supply of electrical power thereto. Although not shown, a suitable thermostat or the like can be provided for regulating the thermal output of the heating element 54. Alternatively, the heating element 54 can be a self-regulating heating element. As seen in FIG. 4, the heating element 54 is located interiorly of both the zero air module 26 and the hydrogen purifier 30.

Figure 5:
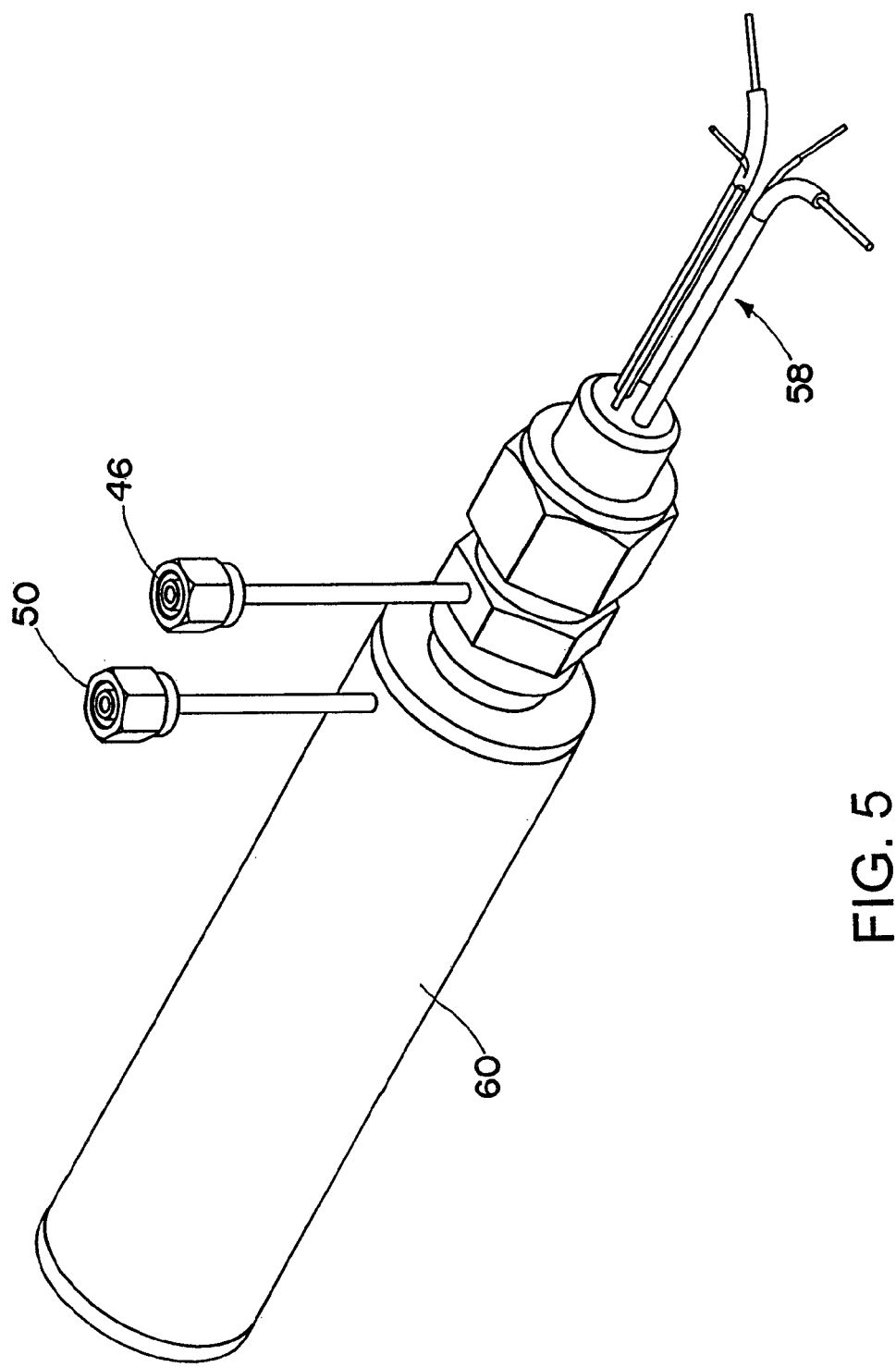
FIG. 5 is a perspective view of an exemplary gas purifier unit of the assembly of FIGS. 1-4.
Figure 6:
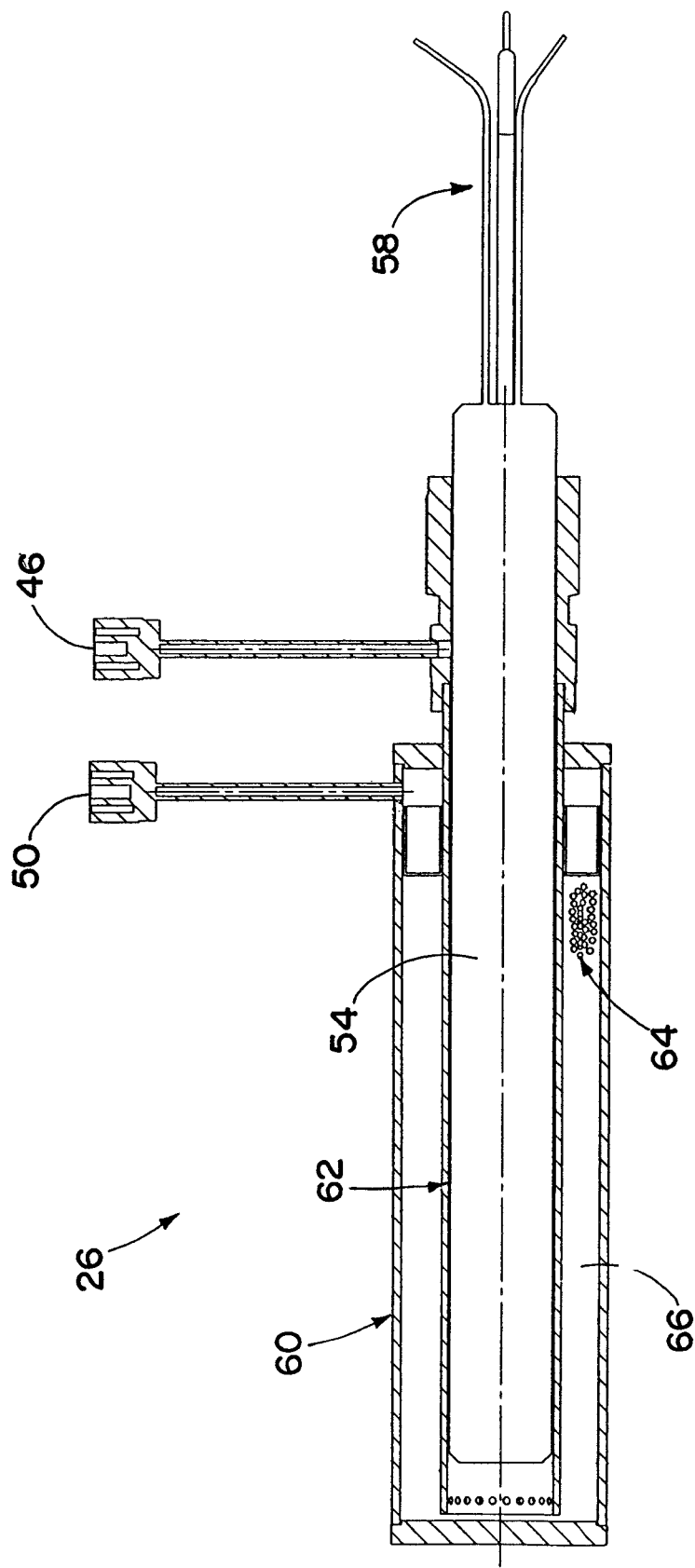
FIG. 6 is a cross-sectional view of the gas purifier of FIG. 5.

With reference to FIGS. 5 and 6, the details of the zero air module 26 are shown. The zero air module 26 has a generally cylindrical body 60 having a central chamber 62 in which the heating element 54 is received. As is conventional, the zero air module 26 may contain a platinum palladium oxidation catalyst 64 in an annular chamber 66 thereof, for example, through which the compressed air is circulated. When heated to a sufficient temperature, the catalyst 64 affects oxidation of hydrocarbons in the compressed air stream thereby producing zero or hydrocarbon free air for dispensing at outlet 50.

Figure 7:
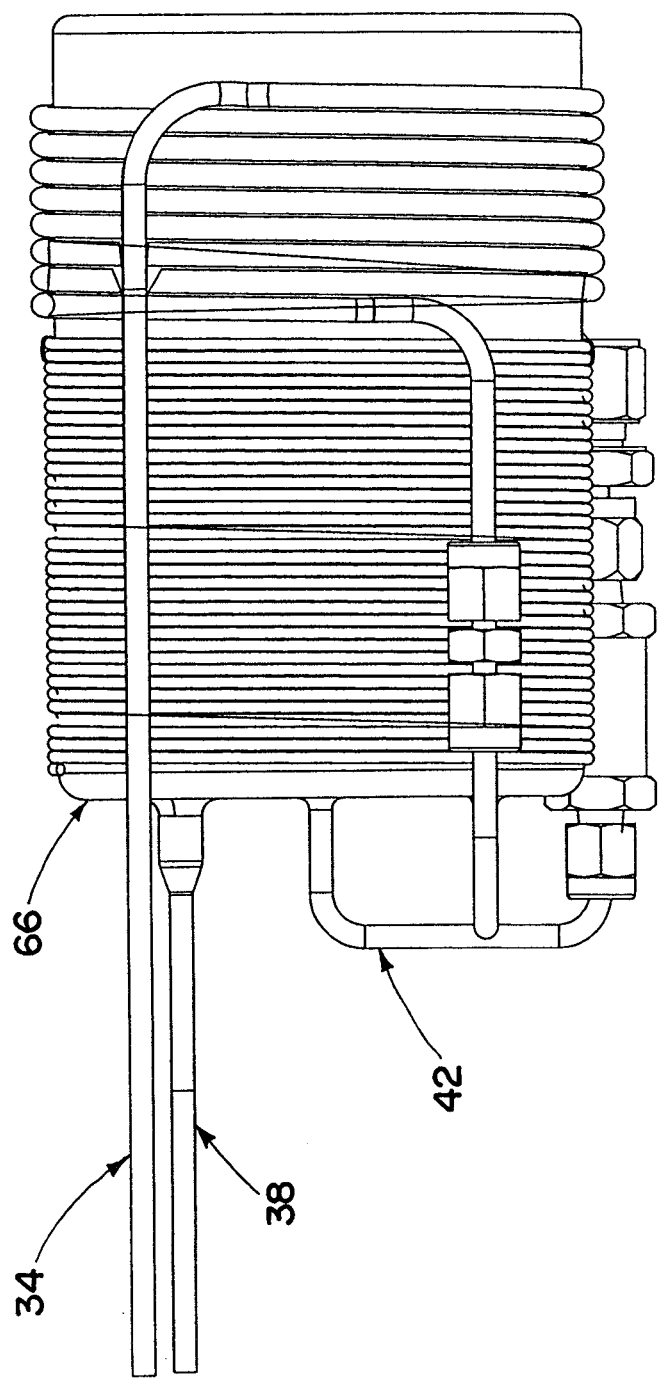
FIG. 7 is a side view of the other exemplary gas purifier unit of the assembly of FIGS. 1-4.
Figure 8:
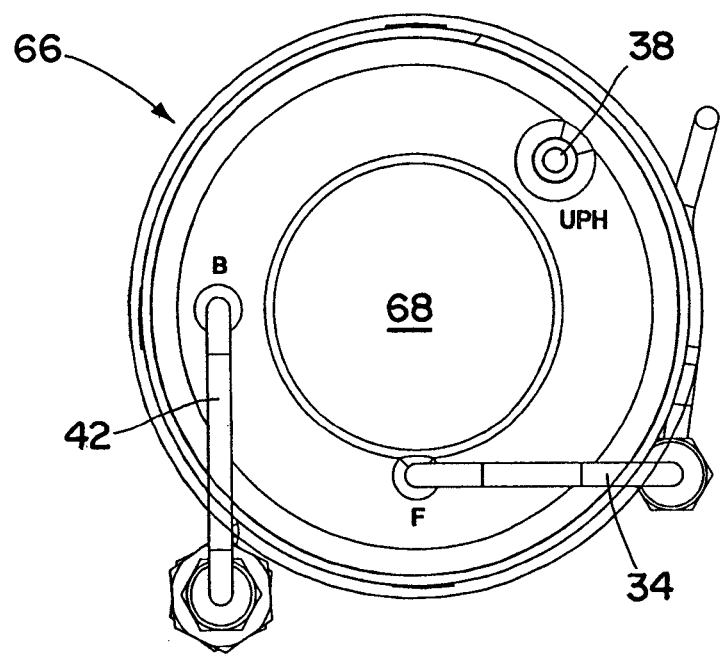
FIG. 8 is an end view of the gas purifier of FIG. 7.

Turning to FIGS. 7 and 8, the hydrogen purifier 30 is illustrated in detail. The hydrogen purifier has a cylindrical body 66 having a central chamber (e.g., bore) 68 therein. As is conventional, the hydrogen purifier 30 may contain a coil of palladium tube, for example, through which the crude hydrogen gas is passed. The palladium tube, when heated to a sufficient temperature, undergoes a beta to alpha phase transition. Under such phase, only hydrogen protons pass through the cross section of the metal matrix, recombining to highly purified hydrogen gas on the downstream surface. This purified hydrogen is then supplied for use through the outlet 38, while the impurities are carried away via the bleed line 42.

Returning to FIG. 4, and in accordance with the invention, it will be appreciated that the heating element 54 is configured to heat directly the zero air module 26 and to heat indirectly the hydrogen purifier 30. Accordingly, the body 60 of the zero air module 26 and inner chamber 68 of the hydrogen purifier 30 are in thermally conductive contact. In this regard, the zero air module 26 can be sized to be slip fit into the hydrogen purifier 30 to facilitate conduction and to permit easy removal and installation of the zero air module 26.

Heat from the heating element 54 first heats the catalyst 62 of the zero air module 26. Waste heat from the zero air module 26 is then transferred primarily via conduction to the hydrogen purifier 30 for heating the palladium coil. As will be appreciated, the relative sizes of the zero air module 26 and hydrogen purifier 30, as well as the capacity of the heating element 54 can be chosen such that adequate heat is transferred from the zero air module 24 to the hydrogen purifier to achieve an adequate operating temperature of the palladium coil.

As compared to utilizing separate purifiers having separate heating sources, the invention enables a purifier assembly that is compact in size, uses a single heat source, and thus can be more efficient to operate. By providing two separate chambers for gaseous fluid flow for the purpose of purifying two separate gasses, and a centrally located heater element that heats the first chamber directly and the second chamber indirectly, waste heat that would otherwise be dissipated to the environment is instead utilized by the unit.

The arrangement of the zero air module 26 and the hydrogen purifier 30 is such that either unit may be removed from the assembly 10 for repair or replacement. Such design can be beneficial since the catalyst 62 of the zero air module 26 may require replacement or replenishment every three years, for example, while the hydrogen purifier 30 may last for ten years or more.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A gas purification system comprising:
    a first gas purifier for purifying a first gas stream, the first gas purifier being a catalytic oxidizer for producing zero air;
    a second gas purifier for purifying a second gas stream, the second gas purifier being a hydrogen purifier including a hydrogen selective membrane; and
    a heating element for heating the first and second gas purifiers;
    wherein the heating element is adapted to heat directly the first gas purifier and to heat indirectly the second gas purifier;
    wherein the first and second gas purifiers are in thermally conductive contact whereby waste heat from the first gas purifier is transferred to the second gas purifier.

2. A gas purification system as set forth in claim 1, wherein the first and second gas purifiers are arranged concentrically about the heating element such that heat from the heating element can be supplied directly to the first gas purifier and indirectly to the second gas purifier.

3. A gas purification system as set forth in claim 1, wherein the first gas purifier includes the heating element.

4. A gas purification system as set forth in claim 3, wherein the zero air module is received in a central chamber of the hydrogen purifier.

5. A gas purification system as set forth in claim 4, wherein the central chamber of the hydrogen purifier is generally cylindrical, and the first gas purifier has generally cylindrical housing configured to be slip fit into the chamber of the hydrogen purifier.

6. A gas purification system as set forth in claim 4, wherein the first gas purifier is removable from the hydrogen purifier as a unit.

7. A gas purification system as set forth in claim 3, wherein the heater element is configured to heat the first gas purifier to about 600 degrees Celsius and the hydrogen purifier to about 400 degrees Celsius.

8. A gas purification system as set forth in claim 1, wherein the hydrogen gas purifier has a palladium/silver filter.

9. A gas purification system as set forth in claim 1, wherein at least one of the gas purifiers is removable from the system as a unit.

10. A gas purification system, comprising:
- a hydrogen purifier including a hydrogen selective membrane for producing a purified hydrogen gas stream when heated, the purifier having an inlet for receiving a crude gas stream and an outlet through which the purified gas stream can flow;
- a catalytic oxidizer zero air module for producing a stream of purified hydrocarbon-free air when heated, the module having an inlet for receiving crude air and an outlet through which purified air stream can flow; and
- a heater element for supplying heat to both the hydrogen purifier and the zero air module;
- wherein the hydrogen purifier is adapted to receive waste heat from the zero air module for heating the hydrogen purifier to a prescribed temperature for producing the purified gas stream.

11. A gas purification system as set forth in claim 10, wherein the hydrogen purifier at least partially surrounds and is in contact with the zero air module.

12. A gas purification system as set forth in claim 10, wherein the hydrogen purifier has a central chamber in which the zero air module is received whereby heat is transferred to the gas purifier via conduction.

13. A gas purification system as set forth in claim 10, wherein the central chamber of the hydrogen purifier is generally cylindrical, and the zero air module has generally cylindrical housing configured to be slip fit into the chamber of the hydrogen purifier.

14. A gas purification system as set forth in claim 10, wherein the zero air module and hydrogen purifier are arranged concentrically about the heating element such that heat from the heating element can be supplied directly to the zero air module and indirectly to the hydrogen purifier.

15. A gas purification system as set forth in claim 10, wherein the zero-air module is removable from the purification system as a unit.

16. A gas purification system as set forth in claim 10, wherein the hydrogen purifier is removable from the purification system as a unit.

17. A gas purification system as set forth in claim 10, wherein the heater element is configured to heat the zero air module to about 600degrees Celsius and the hydrogen purifier to about 400 degrees Celsius.

18. A gas purification system as set forth in claim 8, wherein the first gas purifier includes a platinum palladium oxidation catalyst.

\* \* \* \* \*

UNITED STATES PATENT AND TRADEMARK OFFICE
CERTIFICATE OF CORRECTION

PATENT NO.       : 8,608,836 B2                                       Page 1 of 1
APPLICATION NO.  : 12/995055
DATED            : December 17, 2013
INVENTOR(S)      : Girard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this

Twenty-second Day of September, 2015

Michelle K. Lee
*Director of the United States Patent and Trademark Office*